United States Patent
Kim et al.

(10) Patent No.: US 7,958,015 B2
(45) Date of Patent: Jun. 7, 2011

(54) METHOD, MEDIUM, AND SYSTEM FOR MARKETING INTEGRATED CIRCUITS

(75) Inventors: Neil Y. Kim, Laguna Niguel, CA (US); Pieter Vorenkamp, Laguna Niguel, CA (US)

(73) Assignee: Broadcom Corporation, Irvine, CA (US)

(*) Notice: Subject to any disclaimer, the term of this patent is extended or adjusted under 35 U.S.C. 154(b) by 1300 days.

(21) Appl. No.: 11/173,471

(22) Filed: Jun. 30, 2005

(65) Prior Publication Data

US 2006/0010088 A1    Jan. 12, 2006

Related U.S. Application Data (60) Provisional application No. 60/585,626, filed on Jul. 6, 2004.

(51) Int. Cl.
*G06Q 30/00*      (2006.01)
(52) U.S. Cl. ........................ 705/26.1; 705/27.1
(58) Field of Classification Search .......... 705/26, 705/27, 26.1, 27.1
See application file for complete search history.

(56) References Cited

U.S. PATENT DOCUMENTS

| | | | |
|---|---|---|---|
| 7,107,226 B1 * | 9/2006 | Cassidy et al. | 705/26 |
| 2001/0044758 A1 * | 11/2001 | Talib et al. | 705/27 |

OTHER PUBLICATIONS

Bajarin, Fry's: A One-Stop Shopping Emporium and Cultural Icon, PC Week, vol. 7, No. 26, p. 110(1), Jul. 2, 1990.*

* cited by examiner

*Primary Examiner* — Yogesh C Garg
*Assistant Examiner* — Matthew Zimmerman
(74) *Attorney, Agent, or Firm* — McAndrews, Held & Malloy, Ltd.

(57) ABSTRACT

A system and method for marketing and/or providing integrated circuits. Various aspects of the present invention may provide a computer system adapted to receive and process a request for information regarding an integrated circuit. A database may comprise information of a first set of the integrated circuits that meet performance requirements at nominal power supply characteristics, and information of a second set of the integrated circuits that do not meet the performance requirements at the nominal power supply characteristics and meet the performance requirements at non-nominal power supply characteristics. A processor module may, upon receipt of a request for information regarding the integrated circuit, process information in the database to determine whether the second set of integrated circuits is available. A communication interface module may electronically communicate information of the second set of the integrated circuits (e.g., to the source of the request for information regarding the integrated circuit).

30 Claims, 3 Drawing Sheets

METHOD, MEDIUM, AND SYSTEM FOR MARKETING INTEGRATED CIRCUITS

CROSS-REFERENCE TO RELATED APPLICATIONS/INCORPORATION BY REFERENCE

This patent application is related to and claims priority from provisional patent application Ser. No. 60/585,626, filed Jul. 6, 2004, and entitled "SYSTEM AND METHOD FOR MARKETING INTEGRATED CIRCUITS," the contents of which are hereby incorporated herein by reference in their entirety.

FEDERALLY SPONSORED RESEARCH OR DEVELOPMENT

[Not Applicable]

SEQUENCE LISTING

[Not Applicable]

MICROFICHE/COPYRIGHT REFERENCE

[Not Applicable]

BACKGROUND OF THE INVENTION

Integrated circuits are typically designed to operate under nominal power supply characteristics. For example and without limitation, an integrated circuit may be designed to operate at a nominal level of performance when powered at a nominal voltage level.

Integrated circuit manufacturing may produce integrated circuits of the same design having varying levels of performance. Such variance may, for example, be caused by manufacturing process variability.

Manufactured integrated circuits are often tested by applying power characterized by nominal power supply characteristics and determining whether the manufactured integrated circuits perform at or above a minimum acceptable performance level. Manufactured integrated circuits that fail such a test are often discarded, resulting in monetary loss for the designer and/or manufacturer.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

Various aspects of the present invention provide a system and method for marketing and/or providing integrated circuits, substantially as shown in and/or described in connection with at least one of the figures, as set forth more completely in the claims. These and other advantages, aspects and novel features of the present invention, as well as details of illustrative aspects thereof, will be more fully understood from the following description and drawings.

DETAILED DESCRIPTION OF THE INVENTION

Integrated circuits are generally designed to operate at planned (or "nominal") power supply characteristics. Such nominal power supply characteristics may comprise specific target values or ranges. Such nominal power supply characteristics may, for example and without limitation, comprise voltage characteristics, such as voltage level and voltage variability (e.g., tolerance limits, noise limits, ripple characteristics, statistical variance, load response, etc.). Such nominal power supply characteristics may also, for example, comprise current characteristics, such as current level and current variability (e.g., tolerance limits, spike or surge characteristics, load response, etc.). Such nominal power supply characteristics may further, for example, comprise various energy or power characteristics.

For example and without limitation, an integrated circuit may be designed to meet performance requirements at a nominal voltage of 1.2 Volts or over a nominal voltage range of 5.0 Volts +/−10%. Also for example, an integrated circuit may be designed to meet performance requirements at an operating current of 1.0 Amperes or over an operating current range of 0.5 Amperes +/−5%. Further for example, an integrated circuit may be designed to meet performance requirements when provided with electrical power having less than a 10% noise component. Still further for example, an integrated circuit may be designed to meet performance requirements, even when subjected to loss of voltage or a substantial voltage drop of no more than a maximum duration.

In general, integrated circuits may be generally designed to meet performance requirements when provided with electrical power characterized by nominal power supply characteristics. Accordingly, the scope of various aspects of the present invention should not be limited by aspects of one or more particular nominal power supply characteristics.

Compared to the nominal (or planned) power supply characteristics, non-nominal power supply characteristics may generally be considered to be different than the nominal power supply characteristics discussed above. Note that a non-nominal range may overlap with a nominal range. That is, the difference between nominal power supply characteristics and non-nominal power supply characteristics may be determined by different single values and/or different range limits, depending on the particular power supply characteristic being compared.

In an exemplary scenario, nominal power supply characteristics may comprise a voltage range of 2.0V +/−0.2V, where any voltage less than 1.8V and more than 2.2V is non-nominal. Also in the exemplary scenario, a tighter voltage tolerance range of +/−0.1V may also be considered non-nominal (e.g., by imposing a tighter tolerance range than the nominal tolerance range).

In another exemplary scenario, nominal power supply characteristics may comprise a maximum voltage variability of +/−10% from a target voltage, where a voltage different than the target voltage by more than 10% is non-nominal (e.g., by being out of the nominal range). Also in the exemplary scenario, a more restrictive voltage variability range of +/−5% from the target voltage may represent a non-nominal range.

In yet another exemplary scenario, nominal power supply characteristics may comprise a maximum amount of noise of +/−20% of the power supply voltage level, where an amount of noise different by more than 20% than the power supply voltage level is non-nominal. Also in the exemplary scenario, more restrictive noise limits of +/−5% may represent a non-nominal range.

In general, compared to the nominal (or planned) power supply characteristics, non-nominal power supply characteristics may generally be considered to be different (e.g., in value or in range, depending on the characteristic) than the nominal power supply characteristics discussed above. Accordingly, the scope of various aspects of the present invention should not be limited by characteristics of a particular difference between nominal and non-nominal power supply characteristics.

As mentioned previously, in general, integrated circuits may be generally designed to meet performance requirements under particular operating conditions. Such performance requirements may comprise characteristics of any of a variety of performance metrics. For example and without limitation, performance may be measured by processing speed of the integrated circuit. Also for example, performance may be measured by operating temperature or energy efficiency of the integrated circuit. Further for example, performance may be measured by performance of the integrated circuit in response to any of a variety of disturbance conditions (e.g., load, noise, various environmental conditions, etc.). Accordingly, the scope of various aspects of the present invention should not be limited by characteristics of any particular integrated circuit performance metric.

Figure 1:
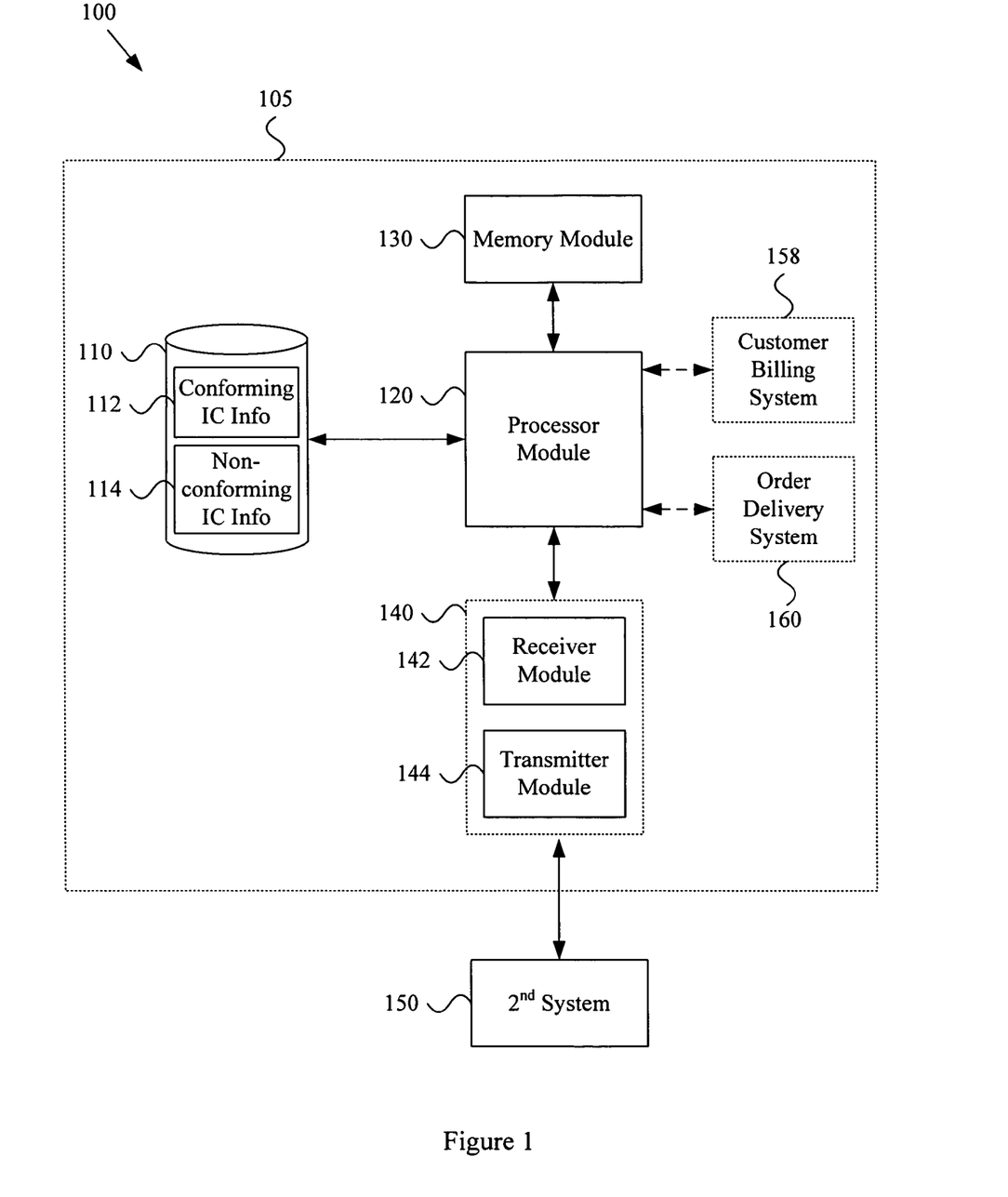
FIG. 1 illustrates a block diagram of an environment comprising an exemplary computer system for marketing and supplying integrated circuits, in accordance with various aspects of the present invention.

FIG. 1 illustrates a block diagram of an environment 100 comprising an exemplary computer system 105 for marketing and/or supplying integrated circuits, in accordance with various aspects of the present invention. The exemplary computer system 105 may comprise a database 110, a processor module 120, a memory module 130 and a communication interface module 140. In various scenarios, the exemplary computer system 105 may also comprise various order management systems (e.g., an order delivery system 160 and/or a customer billing system 158). The exemplary environment 100 may also comprise an exemplary second system 150 (e.g., a second computer system) that is communicatively coupled to the exemplary computer system 105.

The following discussion may refer to various system modules. It should be noted that a "module" may comprise various combinations of hardware and/or software. Further, various portions of modules may be shared between modules. For example, a first module may comprise a first hardware and/or software portion that is also utilized to implement a second module. Accordingly, the scope of various aspects of the present invention should not be limited by characteristics of a particular module implementation or by any arbitrary boundary between modules.

The exemplary computer system 105 may comprise characteristics of any of a variety of computer systems. For example and without limitation, components of the computer system 105 may be co-located or may be distributed. For example, components of the exemplary computer system 105 may be geographically located in the same room or building. Also for example, components of the exemplary computer system 105 may be geographically located in different buildings of a campus or in different campuses, states, regions, nations, etc. Components of the computer system 105 may, for example, be combined in various degrees of integration. For example, various components may reside in the same computer chassis, circuit board or integrated circuit. Accordingly, the scope of various aspects of the present invention should not be limited by characteristics of a particular type of computer system or particular computer system implementation or configuration.

The exemplary computer system 105 may comprise a database 110. The database 110 may, for example, comprise information of a first set of integrated circuits (e.g., of a particular type of integrated circuit) that meet performance requirements at nominal power supply characteristics. The database 110 may also, for example, comprise information of a second set of the integrated circuits that do not meet performance requirements at nominal power supply characteristics. The integrated circuits in the second set of the integrated circuits may, however, meet performance requirements at non-nominal power supply characteristics.

Various aspects of, and comparisons between, nominal and non-nominal power supply characteristics were discussed previously. A particular set of non-nominal power supply characteristics may, for example, be associated with a known power supply circuit. For example, in a non-limiting exemplary scenario, nominal power supply characteristics may comprise a power supply voltage of 1.2V +/−10%, while non-nominal power supply characteristics (e.g., over which a set of integrated circuits were found to meet performance requirements) may comprise a power supply voltage range of 1.25V +/−5%.

Such non-nominal power supply characteristics may correspond to any of a variety of power supply characteristics associated with a known power supply circuit. Such a known power supply circuit may be a constant or variable power supply circuit. Such a known power supply circuit may, for example, comprise one or more particular power supply integrated circuits (e.g., power supply regulator integrated circuits). In general, a particular set of non-nominal power supply characteristics may be associated with a known power supply circuit. Such an association is, however, not necessary. Accordingly, the scope of various aspects of the present invention should not be limited by characteristics of a particular power supply circuit or power supply integrated circuit. Further, the scope of various aspects of the present invention should not be limited by the existence or non-existence of an association between a particular set of non-nominal power supply characteristics and a particular power supply circuit.

The database 110 may comprise any of a variety of information related to the first and/or second sets of the integrated circuit. For example and without limitation, the database 110 may comprise availability information (e.g., inventory, delivery schedule, back-log, etc.). The database 110 may, for example, comprise pricing information related to the first and/or second sets of the integrated circuit (e.g., including information of a discounted price for the second set of the integrated circuits relative to the first set). The database 110 may also, for example, comprise information related to performance of the integrated circuit or sets thereof.

The database 110 may comprise information related to usage of the integrated circuit. Such usage information may, for example, comprise information of how to use the integrated circuit. Such usage information may also, for example, comprise information of circuits that are compatible with the integrated circuit (e.g., power supply circuits). Accordingly, the scope of various aspects of the present invention should not be limited by characteristics of particular database information related to the integrated circuit.

The exemplary computer system 105 may comprise a processor module 120 that is communicatively coupled to the database 110. The processor module 120 may, upon receipt of an inquiry or request (e.g., an electronic request) for information regarding an integrated circuit, process information in the database 110 to determine whether the integrated circuit is available. The processor module 120 may, for example and without limitation, perform such processing automatically (e.g., without human interaction) upon receipt of such a request.

For example, the processor module 120 may process information in the database 110 to determine whether a first set of the integrated circuits that meet performance requirements at nominal power supply characteristics is available. Also for example, the processor module 120 may process information in the database 110 to determine whether a second set of the integrated circuits is available, where the integrated circuits in the second set do not meet performance requirements at nominal power supply characteristics and do meet performance requirements at non-nominal power supply characteristics.

The request (e.g., electronic request) may comprise any of a variety of characteristics. For example, an electronic request may comprise any of a variety of information. For example and without limitation, the electronic request may comprise information identifying (e.g., part number, part category, other part descriptors, etc.) one or more integrated circuits for which information is desired. Also for example, the electronic request may comprise part quantity information. Further for example, the electronic request may comprise customer identification information. The electronic request may, in various scenarios, comprise information related to ordering a quantity of the integrated circuit (e.g., at least a portion of the first and/or second sets discussed previously).

The electronic request may also, for example, comprise power supply information. In a non-limiting exemplary scenario, the electronic request may comprise information identifying a requested integrated circuit and information describing characteristics of a power supply circuit with which the requested integrated circuit may be utilized. For example and without limitation, the electronic request may comprise power supply information describing (or otherwise indicative of) power supply capability for providing electrical power having non-nominal characteristics. In a non-limiting exemplary scenario, such power supply information may comprise information indicating flexibility of a particular power supply to operate outside of a particular voltage range or inside of a particular voltage tolerance range.

The electronic request may, for example, comprise any of a variety of forms. For example and without limitation, the electronic request may comprise a web-generated request (e.g., formed in response to web page interaction). Such an electronic request may, for example, comprise executable (e.g., an applet) or non-executable characteristics. Also for example, the electronic request may comprise e-mail characteristics. Further for example, the electronic request may comprise characteristics of a custom non-standard message structure.

The electronic request may be generated by any of a plurality of sources. For example and without limitation, the electronic request may be generated by a computer system operated by a remotely located customer. Also for example, the electronic request may be generated by a computer system operated by a field sales agent or a sales agent on-site with the computer system 105. Further for example, the electronic request may be generated automatically by a material management system of a production facility or parts distribution facility.

In general, the request (e.g., electronic request) may comprise any of a variety of characteristics. Accordingly, the scope of various aspects of the present invention should not be limited by characteristics of particular information in the request, a particular form of the request or a particular source of the request.

As mentioned previously, the processor module 120 may process information in the database to determine whether the integrated circuit (e.g., the second set of the integrated circuits that meet performance requirements at non-nominal power supply characteristics) is available. The processor module 120 may also, for example, analyze power supply information received with (or associated with) a received electronic request for information. Such power supply information may, for example, comprise information of power supply circuitry that supplies nominal power supply characteristics for the integrated circuit or of power supply circuitry that supplies non-nominal power supply characteristics for the integrated circuit.

In a non-limiting exemplary scenario, the processor module 120 may process received power supply information to determine power supply characteristics under which the integrated circuit(s) may be required to operate. Such power supply information may comprise any of a variety of power supply information. For example and without limitation, such power supply information may comprise information identifying a known power supply circuit and/or integrated circuit. Also for example, such power supply information may comprise information identifying various power supply characteristics, such as, voltage level or variability, current level or variability, load response, noise level, etc.

The processor module 120 may, for example, determine from the power supply information, that the integrated circuit will be utilized with non-nominal power supply characteristics. The processor module 120 may, through interaction with the database 110, determine availability of a set of the integrated circuits that will meet performance requirements at the non-nominal power supply characteristics.

In general, the processor module 120 may process received power supply information to determine whether a particular set of an integrated circuit (e.g., the first or second sets discussed previously) is available. Accordingly, the scope of various aspects of the present invention should not be limited by characteristics of a particular manner in which such power supply information may be processed or by whether such power supply information is received or processed.

The exemplary computer system 105 may comprise a memory module 130. The memory module 130 may, for example, comprise software instructions that govern the operation of the processor module 120. Also for example, the memory module 130 may store any of a large variety of pre-processing, processing or post-processing data. The memory module 130 may, for example, store information related to a received electronic inquiry or information related to a message responding to such a received inquiry. The memory module 130 may comprise any of a large variety of computer readable media and associated interface components. The scope of various aspects of the present invention should not be limited by characteristics of any particular type of memory module or by particular information that may be stored on such a memory module.

The exemplary computer system 105 may comprise a communication interface module 140. The communication interface module 140 may, for example, electronically communicate information between the processor module 120 (or other module of the computer system 105) and a second system 150 (e.g., a second computer system). The communication interface module 140 may, for example, comprise characteristics of a communication receiver, transmitter or transceiver.

For example, in a non-limiting exemplary scenario, the communication interface module 140 may receive an electronic request for information concerning an integrated circuit (e.g., from a second system 150). Note that such a second system 150 may, for example and without limitation, comprise characteristics of a computer system, communication device, user interface device, etc. Continuing the exemplary scenario, the processor module 120 may process information in the received electronic request and information in the database 110 to determine whether a first and second set of the integrated circuits is available (e.g., where the first and second sets of the integrated circuits are as discussed previously). The processor module 120 may then, for example, form a response message concerning the first and/or second sets of the integrated circuits and communicate the response message to the communication interface module 140. The communication interface module 140 may then, in turn, communicate the response message to a destination (e.g., the second system 150 from which the electronic request was received).

A response message may comprise any of a variety of characteristics. For example, the response message may comprise any of a variety of information. The response message may, for example, comprise information of the first and/or second sets of the integrated circuits discussed previously. The response message may, for example, comprise information of availability and/or pricing of the first and/or second sets of the integrated circuits discussed previously. Also for example, the response message may comprise information related to placing an order for the integrated circuit or making payment for such an order. Further for example, the response message may comprise shipping information related to the integrated circuit. Further for example, the response message may comprise information related to utilization of the integrated circuit.

In an exemplary scenario, a response message may comprise information of a second set of the integrated circuits that do not meet performance requirements at nominal power supply characteristics and do meet performance requirements at non-nominal power supply characteristics. The response message may also, for example, comprise information regarding power supply circuitry that may be utilized to provide electrical power characterized by such non-nominal power supply characteristics to the integrated circuit. Such power supply information may, for example, comprise information related to particular power supply circuit devices (e.g., power supply or power regulator ICs) and/or information related to particular power supply circuit configurations.

The response message may comprise any of variety of forms. For example, the response message may comprise information provided on a web page (e.g., generated by HTML, ASP or other web-related languages). Also for example, a response message may comprise information presented in an email format. Further for example, a response message may comprise information presented on a custom form communicated with graphical data. Still further for example, the response message may comprise video signals to drive a display device or other user interface device.

The response message may be communicated (e.g., by the communication interface module 140) to any of a variety of destinations. For example and without limitation, the response message may be communicated to a second computer system that originated an electronic request that triggered the generation of the response message. Also for example, the response message may be communicated to a destination indicated in the received electronic request. Further for example, the response message may be communicated to a destination associated with a particular customer. Additionally, for example, the response message may be communicated to an order management system (e.g., a customer billing system, order delivery system, inventory management system, etc.). Still further for example, the response message may be communicated to a user interface device.

In general, the response message may comprise any of a variety of characteristics. Accordingly, the scope of various aspects of the present invention should not be limited by characteristics of particular information in a response message, a particular type of response message, a particular destination of a response message, or particular manner of generating and/or communicating a response message.

The communication interface module 140 may receive an electronic request or communicate a response message to an electronic request (e.g., regarding an integrated circuit) over any of a variety of communication networks. For example and without limitation, the communication interface module 140 may be adapted to (i.e., comprise hardware and/or software components to) communicate over a computer communication network. Such a computer communication network may, for example, comprise the Internet, a local area network, personal area network, wide area network, metropolitan area network, satellite communication network, etc. Such a computer communication network may utilize any of a large variety of communication media or protocols for communication. Accordingly, the scope of various aspects of the present invention should not be limited by characteristics of a particular computer communication network, media, protocol or interface.

The exemplary environment 100 illustrated in FIG. 1 shows a second system 150. The second system 150 may, for example and without limitation, comprise any of variety of computer system characteristics. For example and without limitation, the second system 150 may comprise a computer workstation that is co-located (e.g., in the same room) as the computer system 105. Also for example, the second system 150 may comprise a computer system that is communicatively coupled to the computer system 105 through a company LAN or WAN. Further for example, the second system 150 may comprise a personal computer system (e.g., desktop, laptop or packet computer) that is communicatively coupled to the computer system 105 through the Internet. Still further for example, the second system 150 may comprise a personal digital assistant, pocket computer or other device that is communicatively coupled to the computer system 105 through a telecommunications network.

In general, the second system 150 may comprise characteristics of any of a variety of systems (e.g., including computer systems). Accordingly, the scope of various aspects of the present invention should not be limited by characteristics of a particular system.

It must be noted that, though the exemplary environment 100 illustrated in FIG. 1 only shows the second system 150 communicatively coupled to the computer system 105, the scope of various aspects of the present invention should by no means be limited to a single system. For example, the environment 100 may comprise a plurality, and in fact a large number, of such systems, each of which may communicate electronic requests to and/or receive responses from the computer system 105.

The exemplary computer system 110 may comprise various systems or sub-systems that process integrated circuit orders and deliver product to the customer. Such processing may, for example and without limitation, comprise inventory management, billing and invoice processing, account maintenance, arranging delivery, etc. Such processing may, for example, be performed automatically (e.g., without human interaction) or with varying degrees of human interaction. The exemplary computer system 110 illustrated in FIG. 1 comprises two exemplary modules related to such processing and delivery (e.g., the customer billing system 158 and the order delivery system 160).

As mentioned previously, a request message may be received by the communication interface module 140. Also as mentioned previously, a request message may, for example, comprise ordering information for the integrated circuit. In an exemplary scenario where a request message comprises ordering information related to a customer placing an order for the integrated circuit, the processor module 120 may process the request message and interface with the customer billing system 158 to manage transfer of capital assets associated with the order. The customer billing system 158 may, for example, be communicatively coupled to various banking institutions and automatically manage transfer of the capital assets. The customer billing system 158 may, for example and without limitation, utilize the communication interface module 140 to establish communications with various financial networks.

The processor module 120 may also, for example, interface with the order delivery system 160 and direct the order delivery system 160 to deliver the ordered integrated circuits to the customer. The order delivery system 160 may generally manage and/or perform delivery of ordered integrated circuits to a customer in any of a variety of manners. For example and without limitation, the order deliver system 160 may interface with a warehouse and shipping system to direct delivery of ordered integrated circuits to the customer. The order delivery system 160 may, for example and without limitation, utilize the communication interface module 140 to establish communications with various inventory and shipping networks.

In general, the exemplary computer system 110 may comprise various systems or sub-systems that process integrated circuit orders and deliver order integrated circuits to the customer. Accordingly, the scope of various aspects of the present invention should not be limited by characteristics of any particular order management systems or sub-systems or by characteristics of any particular system architecture to perform order processing.

The exemplary environment 100 and computer system 110 were presented to illustrate a portion of generally broader aspects of the present invention. Accordingly, the scope of various aspects of the present invention should not be limited by characteristics of the exemplary environment 100 and computer system 110.

Figure 2:
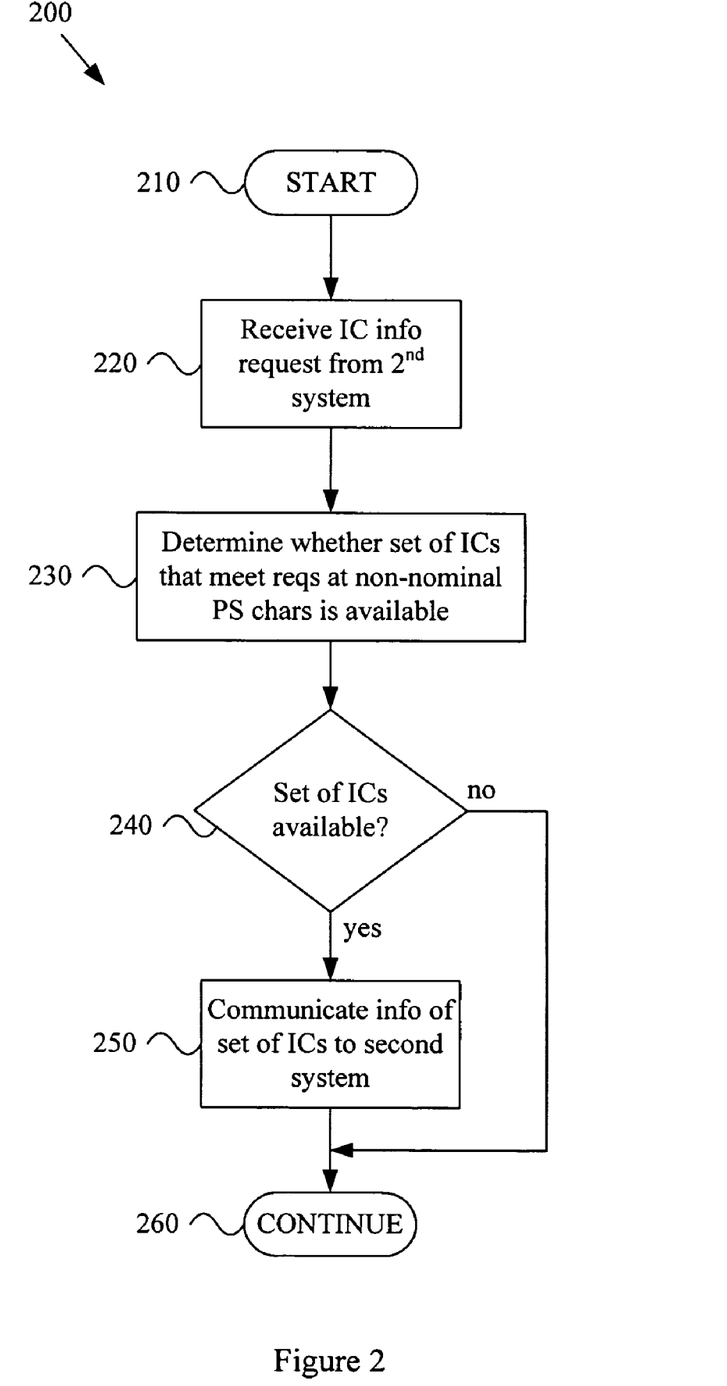
FIG. 2 shows a flow diagram for an exemplary method for marketing integrated circuits, in accordance with various aspects of the present invention.

FIG. 2 shows a flow diagram for an exemplary method 200 for marketing integrated circuits, in accordance with various aspects of the present invention. The exemplary method 200 may, for example and without limitation, share various characteristics with the functionality of the exemplary system 100 illustrated in FIG. 1 and discussed previously. A computer system may, for example, implement the exemplary method 200.

The exemplary method 200 may begin at step 210. The exemplary method 200 (and other methods and/or functionality discussed herein) may begin for any of a variety of reasons. For example and without limitation, the method 200 may begin in response to a system power-up or reset event. The method 200 may also, for example, begin in response to a command (e.g., generated by a user or a system). The method 200 may further, for example, begin in response to a detected operating and/or environmental condition. The method 200 may also, for example, begin in response to arrival of a message at a computer system implementing the method 200. Accordingly, the scope of various aspects of the present invention should not be limited by characteristics of any particular initiating cause or condition.

The exemplary method 200 may, at step 220, comprise receiving a request (e.g., an electronic request) from a source (e.g., a second system or second computer system) for information regarding an integrated circuit. Exemplary step 220 may, for example and without limitation, share various characteristics with the functionality discussed previously with regard to the communication interface module 140 of the exemplary system 100 illustrated in FIG. 1.

A received request (e.g., an electronic request) may comprise any of a variety of characteristics. For example, as discussed previously, an electronic request may comprise any of a variety of information. For example and without limitation, the electronic request may comprise information identifying (e.g., part number, part category, other part descriptors, etc.) one or more integrated circuits for which information is desired. Also for example, the electronic request may comprise part quantity information. Further for example, the electronic request may comprise customer identification information. The electronic request may, in various scenarios, comprise information related to ordering a quantity of the integrated circuit (e.g., at least a portion of the first and/or second sets of the integrated circuits discussed previously).

The electronic request may also, for example, comprise power supply information. In a non-limiting exemplary scenario, the electronic request may comprise information identifying a requested integrated circuit and information describing characteristics of a power supply circuit with which the requested integrated circuit may be utilized. For example and without limitation, the electronic request may comprise power supply information describing (or otherwise indicative of) power supply capability for providing electrical power having non-nominal characteristics. In a non-limiting exemplary scenario, such power supply information may comprise information indicating flexibility of a particular power supply to operate outside of a particular voltage range or inside of a particular voltage tolerance range.

The electronic request may, for example, comprise any of a variety of forms. For example and without limitation, the electronic request may comprise a web-generated request (e.g., formed in response to web page interaction). Such an electronic request may, for example, comprise executable (e.g., an applet) or non-executable characteristics. Also for example, the electronic request may comprise e-mail characteristics. Additionally, for example, the electronic request may comprise characteristics associated with a signal generated by a user interface device. Further for example, the electronic request may comprise characteristics of a custom non-standard message structure.

The electronic request may be generated by any of a plurality of sources. For example and without limitation, the electronic request may be generated by a computer system operated by a remotely located customer. Such a request may, for example, comprise a request originating at a customer site and entered into a system implementing the method 200 (e.g., using a readable storage medium, a keyboard, a mouse, a bar code scanner, a scanner with pattern recognition, voice recognition, etc.). Also for example, the electronic request may be generated by a computer system operated by a field sales agent or a sales agent on-site with the computer system.

Further for example, the electronic request may be generated automatically by a material management system of a production facility or parts distribution facility. Additionally for example, the electronic request may be received through a user interface link. The electronic request may also be received over any of a variety of communication networks. For example, a communication network may comprise the Internet, a LAN, WAN, MAN, PAN, telecommunications network, satellite communication network, television communication network, dedicated or general communication lines, etc.

In general, a request (e.g., electronic request) may comprise any of a variety of characteristics. Accordingly, the scope of various aspects of the present invention should not be limited by characteristics of a particular type of request information, a particular request form, a particular request source, a particular communication network, or any particular manner in which a request may be received.

The exemplary method 200 may, at step 230, comprise determining whether a set of the integrated circuits that meet performance requirements at non-nominal power supply characteristics is available. Step 230 may alternatively, for example and without limitation, comprise determining whether a set of integrated circuits that meet performance requirements at non-nominal power supply characteristics and do not meet performance requirements at nominal power supply characteristics is available. Step 230 may, for example and without limitation share various characteristics with functionality discussed previously with regard to the database 110 and processor module 120 of the exemplary system 100 illustrated in FIG. 1.

Nominal and non-nominal power supply characteristics were discussed previously in the discussion of FIG. 1. As discussed previously, compared to the nominal (or planned) power supply characteristics, non-nominal power supply characteristics may generally be considered to be different (e.g., different in value or range, depending on the characteristic) than nominal power supply characteristics.

Also as discussed previously, non-nominal power supply characteristics may correspond to any of a variety of power supply characteristics associated with a known power supply circuit. Such a known power supply circuit may be a constant or variable power supply circuit. Such a known power supply circuit may, for example, comprise one or more particular power supply integrated circuits (e.g., power supply regulator integrated circuits). In general, a particular set of non-nominal power supply characteristics may be associated with a known power supply circuit. Such an association is, however, not necessary.

In general, exemplary step 230 may comprise determining whether a set of the integrated circuits that meet performance requirements at non-nominal power supply characteristics (e.g., and also do not meet performance requirements at nominal power supply characteristics) is available. Accordingly, the scope of various aspects of the present invention should not be limited by characteristics of a particular power supply circuit or power supply integrated circuit. Further, the scope of various aspects of the present invention should not be limited by the existence or non-existence of an association between a particular set of non-nominal power supply characteristics and a particular power supply circuit.

Step 230 may, for example, comprise processing information in a database to determine whether a first set of the integrated circuits that meet performance requirements at nominal power supply characteristics is available. Also for example, step 230 may comprise processing information in a database to determine whether a second set of the integrated circuits is available, where the integrated circuits in the second set meet performance requirements at non-nominal power supply characteristics (e.g., and do not meet performance requirements at nominal power supply characteristics).

As discussed previously with regard to the exemplary database 110 of FIG. 1, a database may comprise any of a variety of information regarding the integrated circuit and/or other circuits. Accordingly, the scope of various aspects of the present invention should not be limited by characteristics of information regarding an integrated circuit that may be stored in a database.

In a non-limiting exemplary scenario, step 230 may, for example, comprise analyzing power supply information received with (or associated with) a received electronic request for integrated circuit information. Such power supply information may, for example, comprise information of power supply circuitry that may supply nominal power supply characteristics for the integrated circuit or of power supply circuitry that may supply non-nominal power supply characteristics for the integrated circuit.

In an exemplary scenario, step 230 may comprise processing received power supply information to determine power supply characteristics under which the integrated circuit(s) may be required to operate. Such power supply information may comprise any of a variety of power supply information. For example and without limitation, such power supply information may comprise information identifying a known power supply circuit and/or integrated circuit. Also for example, such power supply information may comprise information identifying various power supply characteristics, such as, voltage level or variability, current level or variability, load response, noise level, etc.

Exemplary step 230 may, for example, comprise determining from the power supply information that the integrated circuit will be utilized with non-nominal power supply characteristics. Step 230 may, for example, through interaction with a database, determine availability of a set of the integrated circuits that will meet performance requirements at the non-nominal power supply characteristics.

In general, exemplary step 230 may comprise processing received power supply information to determine whether a particular set (e.g., the first or second sets discussed previously) of the integrated circuit is available. Accordingly, the scope of various aspects of the present invention should not be limited by characteristics of a particular manner in which such power supply information may be processed or by whether such power supply information is received or processed.

The exemplary method 200 may, at step 240, comprise controlling execution flow of the method 200. If step 230 determines that a set of the integrated circuits (e.g., the first and/or second sets of the integrated circuits discussed previously) is not available, then step 240 may direct execution flow to step 260 for continued processing. If, however, step 230 determines that a set of the integrated circuits (e.g., the first and/or second sets of the integrated circuits discussed previously) is available, then step 240 may direct execution flow to step 250, discussed below.

The exemplary method 200 may, at step 250, comprise communicating information of a set of the integrated circuits (e.g., the first and/or second sets of the integrated circuits discussed previously). Step 250 may, for example and without limitation, share various characteristics with the processor module 120 and communication interface module 140 of the exemplary system 100 illustrated in FIG. 1 and discussed previously.

Step 250 may, for example, comprise communicating such information, including for example a message comprising such information, to the source of a request for integrated circuit information (e.g., as received at step 220). In an exemplary scenario where step 220 comprises receiving a request for integrated circuit information from a second computer system, step 250 may comprise communicating information of one or more sets of the integrated circuits to the second computer system.

As discussed previously with regard to the response message, the information of a set of the integrated circuits may comprise characteristics of any of a variety of integrated circuit information. For example, such information may comprise information of availability and/or pricing of the first and/or second sets of the integrated circuits discussed previously. In an exemplary scenario, the second set of the integrated circuits may be associated with a discounted price relative to the first set of the integrated circuits. Also for example, such information may comprise information related to placing an order for the integrated circuit or making payment for such an order. Further for example, such information may comprise shipping information related to the integrated circuit. Further for example, such information may comprise information related to utilization of the integrated circuit.

In an exemplary scenario, such information may comprise information of a second set of the integrated circuits that do not meet performance requirements at nominal power supply characteristics and do meet performance requirements at non-nominal power supply characteristics. Such information may also, for example, comprise information regarding power supply circuitry that may be utilized to provide electrical power characterized by such non-nominal power supply characteristics to the integrated circuit. Such power supply information may, for example, comprise information related to particular power supply circuit devices (e.g., power supply or power regulator ICs) and/or information related to particular power supply circuit configurations.

Also, as discussed previously with regard to the response message, the information of a set of the integrated circuits (or a message comprising such information) may comprise any of variety of forms. For example, such information may be provided on a web page (e.g., generated by HTML, active server pages or other web-related languages). Also for example, such information may be presented in an email format. Further for example, such information may be presented on a custom form communicated with graphical data. Still further for example, such information may be provided in a text file.

Step 250 may comprise communicating the information of one or more sets of the integrated circuit to any of a variety of destinations. For example and without limitation, step 250 may comprise communicating such information to a second computer system that originated an electronic request (e.g., as received at step 220). Also for example, step 250 may comprise communicating such information to a destination indicated in a received electronic request (e.g., as received at step 220). Further for example, step 250 may comprise communicating such information to a destination associated with a particular customer. Still further for example, step 250 may comprise communicating such information to an order management system (e.g., a customer billing system, order delivery system, inventory management system, etc.).

Step 250 may comprise communicating the information of one or more sets of the integrated circuit in any of a variety of manners. For example and without limitation, step 250 may comprise communicating such information over a computer communication network. Such a computer communication network may, for example, comprise the Internet, a local area network, personal area network, wide area network, metropolitan area network, satellite network, etc. Such a computer communication network may utilize any of a large variety of communication media or protocols for communication. Step 250 may also, for example, comprise communicating such information over any of a variety of communication networks (e.g., telecommunication networks, television networks, a custom dedicated communication network, etc.). Step 250 may also comprise communicating such information utilizing any of a variety of communication media and/or protocols for such communication.

In general, the information of one or more sets of the integrated circuit may comprise any of a variety of information, and step 250 may comprise communicating such information in any of a variety of manners. Accordingly, the scope of various aspects of the present invention should not be limited by characteristics of a particular type of integrated circuit information, a particular destination for such information, or particular manner of generating and/or communicating such information.

The exemplary method 200 may, at step 260, comprise performing continued processing. Such continued processing may comprise characteristics of any of a large variety of continued processing. For example and without limitation, step 260 may comprise looping method 200 execution to a previous step (e.g., step 220). Further for example, step 260 may comprise soliciting or processing an order for the integrated circuit. Still further for example, step 260 may comprise performing customer billing, inventory management or database management activities. Accordingly, the scope of various aspects of the present invention should not be limited by characteristics of a particular type of continued processing.

The exemplary method 200 was presented to illustrate a portion of generally broader aspects of the present invention. Accordingly, the scope of various aspects of the present invention should not be limited by characteristics of the exemplary method 200.

Figure 3:
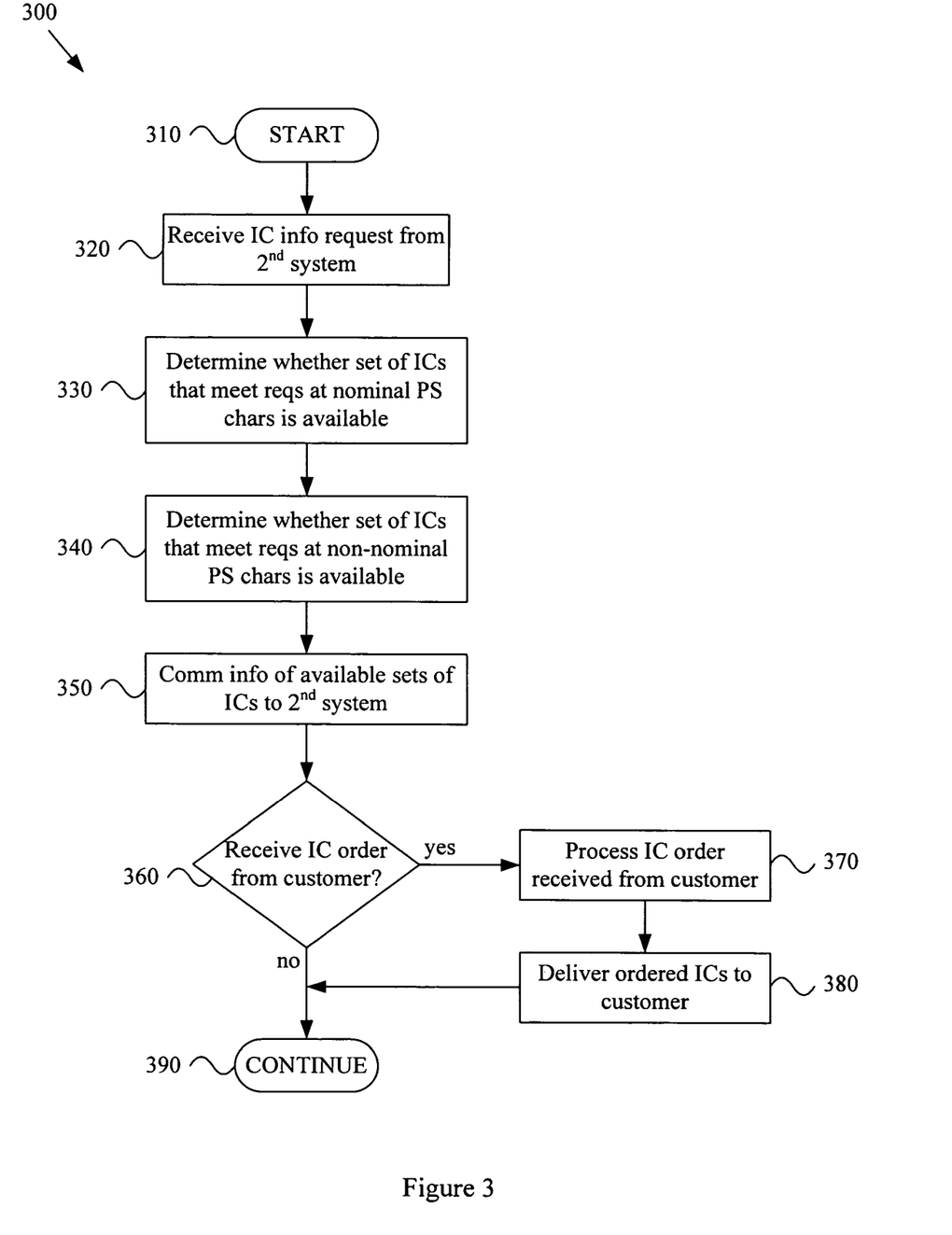
FIG. 3 shows a flow diagram for an exemplary method for marketing and supplying integrated circuits, in accordance with various aspects of the present invention.

FIG. 3 shows a flow diagram for an exemplary method 300 for marketing and supplying integrated circuits, in accordance with various aspects of the present invention. The exemplary method 300 may, for example and without limitation, share various characteristics with the exemplary method 200 illustrated in FIG. 2 and discussed previously. The exemplary method 300 may also, for example and without limitation, share various characteristics with the functionality discussed previously with regard to the exemplary environment 100 and computer system 110 illustrated in FIG. 1.

The exemplary method 300 may, at step 320, comprise receiving a request (e.g., an electronic request) from a source (e.g., a second system or second computer system) for information regarding an integrated circuit. Exemplary step 320 may, for example and without limitation, share various characteristics with step 220 of the exemplary method 200 illustrated in FIG. 2 and discussed previously.

The exemplary method 300 may, at step 330, comprise determining whether a first set of the integrated circuits that meet performance requirements at nominal power supply characteristics is available. The exemplary step 330 may, for example and without limitation, share various characteristics with step 230 of the exemplary method 200 illustrated in FIG. 2 and discussed previously, albeit with respect to integrated circuits meeting performance requirements at nominal power supply characteristics rather than integrated circuits meeting performance requirements at non-nominal power supply characteristics. Such nominal power supply characteristics and non-nominal power supply characteristics were discussed previously with regard to FIG. 1.

The exemplary method 300 may, at step 340, comprise determining whether a second set of the integrated circuits that meet the performance requirements at non-nominal power supply characteristics is available. Step 340 may alternatively, for example, comprise determining whether a second set of the integrated circuits that meet the performance requirements at non-nominal power supply characteristics and do not meet the performance requirements at nominal power supply characteristics is available. Exemplary step 340 may, for example and without limitation, share various characteristics with step 230 of the exemplary method 200 illustrated in FIG. 2 and discussed previously.

The exemplary method 300 may, at step 350, comprise communicating information of at least one set of the integrated circuits (e.g., the first and/or second sets of the integrated circuits discussed previously). Step 350 may, for example and without limitation, share various characteristics with step 250 of the exemplary system 200 illustrated in FIG. 2 and discussed previously.

For example, step 350 may comprise communicating such information (e.g., a message comprising such information) to the source of a request for integrated circuit information (e.g., as received at step 320). In an exemplary scenario where step 320 comprises receiving a request for integrated circuit information from a second computer system, step 350 may comprise communicating information of one or more sets of the integrated circuits to the second computer system.

The exemplary method 300 may, at step 360, comprise controlling execution flow of the method 300. If step 360 determines that an order for the integrated circuit (e.g., the integrated circuit for which information was requested in the request received at step 320) was not received, then step 360 may direct execution flow to step 390 for continued processing. If, however, step 360 determines that such an order was received, then step 360 may direct execution flow to step 370, discussed below. An order may, for example, comprise various characteristics of an order as discussed previously with regard to FIGS. 1 and 2.

The exemplary method 300 may, at step 370, comprise processing a received integrated circuit order from a customer. Step 370 may, for example and without limitation, share various characteristics with the functionality of the processor module 120 and the customer billing system 158 illustrated in FIG. 1 and discussed previously. Step 370 may, for example, comprise any of a variety of order processing characteristics.

Such a received order may, for example, comprise an order for at least a portion of the first set of the integrated circuits, the availability of which was determined at step 330. Such a received order may, for example, comprise an order for at least a portion of the second set of the integrated circuits, the availability of which was determined at step 340.

The exemplary method 300 may, at step 380, comprise delivering the ordered integrated circuit(s) to the customer. For example and without limitation, step 380 may share various characteristics with the functionality discussed previously with regard to the order delivery system 160 illustrated in FIG. 1.

The exemplary method 300 was presented to illustrate a portion of generally broader aspects of the present invention. Accordingly, the scope of various aspects of the present invention should not be limited by characteristics of the exemplary method 300.

Various functional aspects of the present invention may be performed, at least in part, utilizing computer readable media comprising executable computer instructions. Such computer readable media may, for example and without limitation, comprise characteristics of a computer hard drive, compact disc, digital versatile disc, integrated circuit memory, computer diskette, memory module, etc. A portion of such functional aspects were discussed previously with regard to the exemplary methods 200, 300 illustrated in FIGS. 2-3 and with regard to the functionality of the exemplary environment 100 and computer system 110 illustrated in FIG. 1.

It should also be noted that various aspects of the present invention may be performed by hardware, a processor executing software instructions, or a combination thereof. Additionally, various system components and/or modules discussed previously may be implemented in various degrees of integration. For example and without limitation, various components and/or modules may be implemented in a distributed system or local system. Various components and/or modules may be implemented on a single integrated circuit or a plurality of integrated circuits. Various components and/or modules may be implemented, at least in part, utilizing any of a variety of computer-readable media. Accordingly, the scope of various aspects of the present invention should not be limited by characteristics of any particular implementation.

In summary, various aspects of the present invention provide a system and method for marketing and/or providing integrated circuits. While the invention has been described with reference to certain aspects and embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A computer system for marketing an integrated circuit, the computer system comprising:
   a database comprising information of a first set of the integrated circuits that meet performance requirements at predefined nominal power supply characteristics, and information of a second set of the integrated circuits that do not meet the performance requirements at the predefined nominal power supply characteristics and meet performance requirements at predefined non-nominal power supply characteristics;
   a processor module that is configured to, upon receipt of an electronic request for information regarding the integrated circuit from a second system, identify requested power supply characteristics of the integrated circuit from the electronic request, determine that the requested power supply characteristics satisfy the non-nominal power supply characteristics of the second set of the integrated circuits, and process information in the database to determine whether the second set of the integrated circuits is available; and
   a communication interface module that is configured to electronically communicate information of the second set of the integrated circuits to the second system in response to determining that the second set of integrated circuits is available.

2. The system of claim 1, wherein the predefined nominal power supply characteristics comprise a predefined nominal voltage range, and the non-nominal power supply characteristics comprise a predefined voltage level outside of the predefined nominal voltage range.

3. The system of claim 1, wherein the predefined nominal power supply characteristics comprise a first predefined level of power supply variability, and the predefined non-nominal power supply characteristics comprise a second predefined level of power supply variability that is different from the first predefined level of power supply variability.

4. The system of claim 1, wherein the predefined non-nominal power supply characteristics are in a range of power supply characteristics associated with a variable power supply circuit that the processor module identified from the electronic request.

5. The system of claim 1, wherein the predefined non-nominal power supply characteristics are in a range of power supply characteristics associated with a power supply integrated circuit that the processor module identified from the electronic request.

6. The system of claim 1, wherein the communication interface module is configured to receive the electronic request from the second system over a computer communication network.

7. The system of claim 6, wherein the computer communication network comprises the Internet.

8. The system of claim 1, wherein the information of the second set of the integrated circuits comprises information of a discounted price for the second set of the integrated circuits relative to a price for the first set of the integrated circuits.

9. The system of claim 1, wherein the information of the second set of the integrated circuits comprises information of power supply circuitry related to providing electrical power to one or more of the second set of the integrated circuits, wherein the electrical power is characterized by the predefined non-nominal power supply characteristics.

10. The system of claim 1, wherein the processor module is configured to analyze power supply information of the electronic request received from the second system to identify the requested power supply characteristics of the integrated circuit.

11. The system of claim 10, wherein the power supply information comprises power supply voltage range information.

12. The system of claim 1, wherein the communication interface module is configured to receive an order for at least a portion of the second set of the integrated circuits from a customer and the processor module is configured to process the order, and further comprising an order delivery system that is configured to manage delivery of the ordered integrated circuit(s) to the customer.

13. The system of claim 1, wherein:
the processor module is further configured to determine that the first set of the integrated circuits is available; and
the communication interface module is further configured to electronically communicate information of the first set of the integrated circuits to the second system in response to the processor module determining that the first set of integrated circuits is available.

14. The system of claim 1, wherein the second system comprises a computer system.

15. A method for marketing an integrated circuit, the method comprising:
using a computer to perform the following steps:
receiving an electronic request from a second system for information regarding the integrated circuit;
identifying requested power supply characteristics of the integrated circuit from the electronic request;
determining that the requested power supply characteristics satisfy predefined non-nominal power supply characteristics of a set of the integrated circuits that do not meet performance requirements at predefined nominal power supply characteristics and meet performance requirements at predefined non-nominal power supply characteristics;
determining whether the set of the integrated circuits that do not meet performance requirements at predefined nominal power supply characteristics and meet the performance requirements at the predefined non-nominal power supply characteristics is available; and
communicating information of the set of the integrated circuits to the second system in response to determining the set of integrated circuits is available.

16. The method of claim 15, wherein the predefined nominal power supply characteristics comprise a predefined nominal voltage range, and the predefined non-nominal power supply characteristics comprise a predefined voltage level outside of the nominal voltage range.

17. The method of claim 15, wherein the predefined nominal power supply characteristics comprise a first predefined level of power supply variability, and the predefined non-nominal power supply characteristics comprise a second predefined level of power supply variability that is different from the first predefined level of power supply variability.

18. The method of claim 15, further comprising using the computer to perform the step of identifying a variable power supply circuit from the electronic request, and determining that the predefined non-nominal power supply characteristics are in a range of power supply characteristics associated with the variable power supply circuit.

19. The method of claim 15, further comprising using the computer to perform the step of identifying a power supply circuit from the electronic request, and determining that the predefined non-nominal power supply characteristics are in a range of power supply characteristics associated with the power supply integrated circuit.

20. The method of claim 15, wherein receiving an electronic request from a second system comprises receiving the electronic request from the second system over a computer communication network.

21. The method of claim 20, wherein the computer communication network comprises the Internet.

22. The method of claim 15, wherein communicating the information of the set of the integrated circuits comprises communicating information of a discounted price for the set of the integrated circuits relative to a price for a second set of the integrated circuits that meet performance requirements at predefined nominal power supply characteristics.

23. The method of claim 15, wherein the information of the set of the integrated circuits comprises information of power supply circuitry related to providing electrical power to one or more of the set of the integrated circuits, wherein the electrical power is characterized by predefined non-nominal power supply characteristics.

24. The method of claim 15, wherein identifying the requested power supply characteristics of the integrated circuit comprises analyzing power supply information of the electronic request received from the second system to obtain the requested power supply characteristics of the integrate circuit.

25. The method of claim 24, wherein the power supply information comprises power supply voltage range information.

26. The method of claim 15, further comprising:
using the computer to perform the steps of:
receiving an order for at least a portion of the set of the integrated circuits from a customer;

processing the order; and delivering the ordered integrated circuit(s) to the customer.

27. The method of claim 15, further comprising:

using said computer to perform the steps of:

determining that a second set of the integrated circuits that meet the performance requirements at predefined nominal power supply characteristics is available; and communicating information of the second set of the integrated circuits to the second system in response to determining that the second set of integrated circuits is available.

28. The method of claim 15, wherein the second system comprises a computer system.

29. A non-transitory computer readable medium comprising computer instructions that, when executed by a computer system, cause the computer system to:

process an electronic request for information regarding an integrated circuit to identify requested power supply characteristics of the integrated circuit, where the electronic request is received from a second system;

determine that the requested power supply characteristics satisfy predefined non-nominal power supply characteristics of a set of the integrated circuits that do not meet performance requirements at predefined nominal power supply characteristics and meet performance requirements at predefined non-nominal power supply characteristics, determine that the set of the integrated circuits that do not meet the performance requirements at predefined nominal power supply characteristics and meet the performance requirements at predefined non-nominal power supply characteristics is available; and initiate communication of information to the second system in response to determining that the set of integrated circuits is available, wherein the information comprises information of the set of the integrated circuits.

30. The computer readable medium of claim 29, further comprising computer instructions that, when executed by a computer system, cause the computer system to:

determine that a second set of the integrated circuits that meet the performance requirements at predefined nominal power supply characteristics is available; and initiate communication of second information to the second system in response to determining that the second set of integrated circuits is available, wherein the second information comprises information of the second set of the integrated circuits.

* * * * *